United States Patent
Suciu et al.

(10) Patent No.: US 9,581,108 B2
(45) Date of Patent: Feb. 28, 2017

(54) PIVOT THRUST REVERSER WITH MULTI-POINT ACTUATION

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 660 days.

(21) Appl. No.: 14/184,376

(22) Filed: Feb. 19, 2014

(65) Prior Publication Data

US 2015/0008268 A1    Jan. 8, 2015

Related U.S. Application Data

(60) Provisional application No. 61/768,171, filed on Feb. 22, 2013, provisional application No. 61/768,154, (Continued)

(51) Int. Cl.
*F02K 1/72* (2006.01)
*F02K 1/60* (2006.01)
(Continued)

(52) U.S. Cl.
CPC .............. *F02K 1/72* (2013.01); *B23P 19/04* (2013.01); *B64D 29/00* (2013.01); *F02K 1/605* (2013.01);
(Continued)

(58) Field of Classification Search
CPC ..... F02K 1/70; F02K 1/72; F02K 1/60; F02K 1/62; F02K 1/64; F02K 1/763; F02K 1/605;
(Continued)

(56) References Cited

U.S. PATENT DOCUMENTS 2,282,552 A    5/1942  Banowetz
2,526,791 A   10/1950  Wroblewski
(Continued)

FOREIGN PATENT DOCUMENTS

EP    0515263 B1    8/1994
EP    0756078 A1    1/1997
(Continued)

OTHER PUBLICATIONS

International Search Report and Written Opinion mailed Dec. 17, 2014 for International Application No. PCT/US2014/022955.

*Primary Examiner* — Corey Skurdal
(74) *Attorney, Agent, or Firm* — Kinney & Lange, P.A.

(57) ABSTRACT

One embodiment includes a pivot thrust reverser with a first pivot door with an upper linkage and a lower linkage and a second pivot door, spaced from the first pivot door, with an upper linkage and a lower linkage. A first actuator is located on a first side of an attachment location to drive the first pivot door. A second actuator is located on a second side of the attachment location to drive the second pivot door. A third actuator is located substantially radially opposite the attachment location to drive both the first pivot door and the second pivot door. The first pivot door is configured to be pivoted from a stowed position to a deployed position by both the first actuator and the third actuator. The second pivot door is configured to be pivoted from the stowed position to the deployed position by both the second actuator and the third actuator.

17 Claims, 4 Drawing Sheets

Related U.S. Application Data filed on Feb. 22, 2013, provisional application No. 61/768,160, filed on Feb. 22, 2013, provisional application No. 61/768,166, filed on Feb. 22, 2013, provisional application No. 61/768,172, filed on Feb. 22, 2013.

(51) Int. Cl.
  *F02K 1/62* (2006.01)
  *F02K 1/64* (2006.01)
  *B64D 29/00* (2006.01)
  *B23P 19/04* (2006.01)
  *F02K 1/76* (2006.01)

(52) U.S. Cl.
  CPC ............... *F02K 1/62* (2013.01); *F02K 1/64* (2013.01); *F02K 1/763* (2013.01); *F05D 2260/50* (2013.01); *Y10T 29/49229* (2015.01)

(58) Field of Classification Search
  CPC ... B23P 19/04; B64D 29/00; Y10T 29/49229; F05D 2260/50
  See application file for complete search history.

(56) References Cited

U.S. PATENT DOCUMENTS

| | | |
|---|---|---|
| 3,067,968 A | 12/1962 | Heppenstall |
| 3,601,992 A | 8/1971 | Maison |
| 3,614,037 A | 10/1971 | Vdolek |
| 3,699,682 A | 10/1972 | Kleckner |
| 4,196,856 A | 4/1980 | James |
| 4,278,220 A | 7/1981 | Johnston et al. |
| 4,410,152 A * | 10/1983 | Kennedy ............ F02K 1/563 239/265.27 |
| 4,442,987 A | 4/1984 | Legrand et al. |
| 4,485,970 A | 12/1984 | Fournier et al. |
| 4,825,644 A | 5/1989 | Bubello et al. |
| 4,894,985 A | 1/1990 | Dubois et al. |
| 4,920,744 A | 5/1990 | Garcia et al. |
| 4,960,243 A | 10/1990 | Dubois et al. |
| 5,039,171 A | 8/1991 | Lore |
| 5,090,197 A | 2/1992 | Dubois |
| 5,110,069 A | 5/1992 | Webb |
| 5,117,630 A | 6/1992 | Cariola et al. |
| 5,267,438 A | 12/1993 | Bunel et al. |
| 5,315,821 A | 5/1994 | Dunbar et al. |
| 5,497,961 A | 3/1996 | Newton |
| 5,609,313 A | 3/1997 | Cole et al. |
| 5,642,960 A | 7/1997 | Salice |
| 5,722,231 A | 3/1998 | Porte |
| 5,863,014 A * | 1/1999 | Standish ............ F02K 1/70 239/265.29 |
| 5,941,061 A | 8/1999 | Sherry et al. |
| 5,970,704 A | 10/1999 | Lardy et al. |
| 5,974,783 A | 11/1999 | Gonidec et al. |
| 6,079,201 A | 6/2000 | Jean |
| 6,151,884 A | 11/2000 | Gonidec et al. |
| 6,170,255 B1 | 1/2001 | Gonidec et al. |
| 6,179,249 B1 | 1/2001 | Canadas |
| 6,293,495 B1 | 9/2001 | Aten et al. |
| 6,296,495 B1 | 10/2001 | Wang et al. |
| 6,340,135 B1 | 1/2002 | Barton |
| 6,568,172 B2 | 5/2003 | Jannetta et al. |
| 6,688,099 B2 | 2/2004 | Lair |
| 6,786,038 B2 | 9/2004 | Lair |
| 6,968,675 B2 | 11/2005 | Ramlaoui et al. |
| 7,127,880 B2 | 10/2006 | Lair et al. |
| 7,484,356 B1 | 2/2009 | Lair |
| 7,784,735 B2 | 8/2010 | Marche |
| 7,784,765 B2 | 8/2010 | Ichikawa et al. |
| 7,959,106 B2 | 6/2011 | Guibert et al. |
| 7,959,107 B2 | 6/2011 | Beaufort |
| 8,002,217 B2 | 8/2011 | Sternberger |
| 8,015,797 B2 | 9/2011 | Lair |
| 8,052,085 B2 | 11/2011 | Lair |
| 8,091,827 B2 | 1/2012 | Lair |
| 8,172,175 B2 | 5/2012 | Lair |
| 8,181,905 B2 | 5/2012 | Mcdonough et al. |
| 8,220,738 B2 | 7/2012 | Calder et al. |
| 8,226,027 B2 | 7/2012 | Journade et al. |
| 8,418,436 B2 | 4/2013 | Pero et al. |
| 8,951,006 B2 | 2/2015 | Vauchel et al. |
| 9,188,026 B2 | 11/2015 | Calder et al. |
| 2003/0218094 A1 | 11/2003 | Lair |
| 2005/0039438 A1 | 2/2005 | Lair |
| 2005/0084325 A1 | 4/2005 | O'Brien et al. |
| 2005/0151012 A1 | 7/2005 | Lair |
| 2006/0288688 A1 | 12/2006 | Lair |
| 2008/0072570 A1 | 3/2008 | Lair |
| 2008/0098720 A1 | 5/2008 | Watson |
| 2008/0302083 A1 | 12/2008 | Sloan et al. |
| 2009/0260344 A1 | 10/2009 | Hoyland |
| 2009/0288386 A1 | 11/2009 | Marshall et al. |
| 2009/0313969 A1 | 12/2009 | Lair et al. |
| 2010/0008772 A1 | 1/2010 | Vauchel et al. |
| 2010/0107599 A1 | 5/2010 | Vauchel |
| 2010/0139242 A1 | 6/2010 | Vauchel et al. |
| 2010/0170984 A1 | 7/2010 | Journade et al. |
| 2010/0270428 A1 | 10/2010 | Murphy |
| 2011/0101159 A1 | 5/2011 | Lair et al. |
| 2011/0167790 A1 | 7/2011 | Cloft et al. |
| 2011/0318173 A1 | 12/2011 | Ramlaoui et al. |
| 2012/0005999 A1 | 1/2012 | Pero et al. |
| 2012/0067024 A1 | 3/2012 | Vauchel |
| 2012/0067975 A1 | 3/2012 | Vauchel |
| 2012/0073263 A1 | 3/2012 | Kohlenberg et al. |
| 2012/0325930 A1 | 12/2012 | Pero et al. |
| 2013/0216297 A1 | 8/2013 | Albach |
| 2013/0219002 A1 | 8/2013 | Li et al. |
| 2014/0239083 A1 | 8/2014 | Suciu et al. |
| 2014/0239084 A1 | 8/2014 | Chandler et al. |
| 2015/0121839 A1 | 5/2015 | Chandler et al. |

FOREIGN PATENT DOCUMENTS

| | | |
|---|---|---|
| EP | 0756557 B1 | 5/1998 |
| EP | 0728934 B1 | 5/1999 |
| EP | 0761947 B1 | 5/2000 |
| EP | 0771945 B1 | 1/2001 |
| EP | 0789140 B1 | 11/2001 |
| EP | 0822327 B1 | 8/2003 |
| EP | 2399827 A2 | 12/2011 |
| EP | 1507971 B1 | 1/2012 |
| EP | 1676024 B1 | 10/2012 |
| WO | WO9528318 A1 | 10/1995 |
| WO | WO03100241 A1 | 12/2003 |
| WO | WO2007123556 A2 | 11/2007 |
| WO | WO2011014346 A2 | 2/2011 |

* cited by examiner

PIVOT THRUST REVERSER WITH MULTI-POINT ACTUATION

CROSS-REFERENCE TO RELATED APPLICATION(S)

The present application claims priority to U.S. Provisional Patent Application Ser. No. 61/768,171, entitled "ATR CONTOURED THRUST REVERSER WITH 3 POINT ACUATION," filed Feb. 22, 2013, which is hereby incorporated by reference in its entirety. Priority is also claimed to U.S. Provisional Patent Applications Ser. Nos. 61/768,154, entitled "ATR PIVOT THRUST REVERSER WITH CONTOURING AROUND CORE," filed Feb. 22, 2013; 61/768,160, entitled "ATR TANDEM THRUST REVERSER," filed Feb. 22, 2013; 61/768,166, entitled "ATR TANDEM THRUST REVERSER WITH 4-BAR LINKAGE," filed Feb. 22, 2013; and 61/768,172, entitled "AIR TANDEM THRUST REVERSER WITH 3 POINT ACTUATION," filed Feb. 22, 2013. All of these are hereby incorporated by reference in their entirety.

BACKGROUND

The presently disclosed embodiments relate generally to gas turbine engine and/or nacelle assemblies and, more particularly, to thrust reversers used in gas turbine engine and/or nacelle assemblies.

Thrust reversers in gas turbine engine and/or nacelle assemblies are deployed to redirect an aircraft's propulsive air flow, such as in a forward direction rather than aft. This can provide deceleration for the aircraft which, for example, can assist in slowing the aircraft down during landing, and therefore, enable shorter landing distances while reducing stress and wear on an aircraft's brakes. Thrust reversers are particularly useful when a landing surface is icy or wet, and consequently, the aircraft's brakes are less effective.

Commercial gas turbine engines typically include an engine which produces high temperature, high pressure exhaust ejected through a nozzle downstream of the engine, and a bypass duct, which is generally an annular space concentrically located about the engine through which air from the engine fan, known as the fan bypass stream, is passed. Many aircraft applications use high bypass ratio gas turbine engines, where a majority of the aircraft's propulsion is provided by the fan bypass stream, rather than by the exhaust produced from the engine. In such applications, a thrust reverser may be able to operate effectively by redirecting the fan bypass stream alone.

However, providing a thrust reverser to redirect the fan bypass stream presents design challenges. The thrust reverser must be part of an overall aerodynamic design when stowed, yet be capable of effectively deploying at an appropriate angle which captures enough of the fan bypass stream, and redirects this fan bypass stream at the needed angle, to provide deceleration. Additionally, the design can be further complicated by the need to avoid engine and/or nacelle structures, such as a pylon, that can create obstructions for the thrust reverser. To obtain effective thrust reverser designs, complex assemblies with a multitude of parts have generally been used, often requiring translating parts relative to the engine to allow the thrust reverser to deploy at an effective location. These designs also have generally included an obstruction present in the fan bypass stream reversal flow path, such as actuators or linkages. Moreover, these complex designs are less reliable and require greater maintenance costs. Even with these complex designs, significant portions of the fan bypass stream are not redirected, resulting in a less efficient thrust reverser and, as a consequence, the need for longer landing distances and increased wear on the aircraft's brakes.

SUMMARY

One embodiment includes a pivot thrust reverser for use in a gas turbine engine assembly. The thrust reverser includes a first pivot door with an upper linkage and a lower linkage and a second pivot door, spaced from the first pivot door, with an upper linkage and a lower linkage. A first actuator is located on a first side of an attachment location to drive the upper linkage of the first pivot door. A second actuator is located on a second side of the attachment location to drive the upper linkage of the second pivot door. A third actuator is located substantially radially opposite the attachment location to drive both the lower linkage of the first pivot door and the lower linkage of the second pivot door. The first pivot door is configured to be pivoted from a stowed position to a deployed position by both the first actuator and the third actuator. The second pivot door is configured to be pivoted from the stowed position to the deployed position by both the second actuator and the third actuator.

Another embodiment includes a method for use in a gas turbine engine assembly. A first pivot door is pivoted from a stowed position to a deployed position by a first actuator and a third actuator. A second pivot door, spaced from the first pivot door, is pivoted from the stowed position to the deployed position by a second actuator and the third actuator.

Figure 1A:
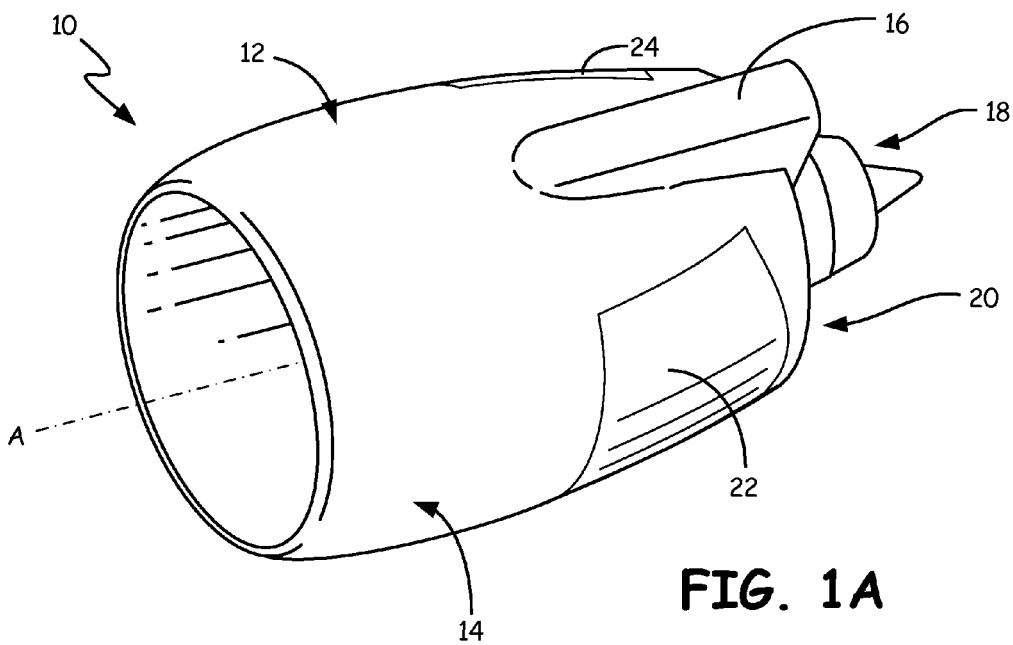
FIG. 1A is a perspective view of an embodiment of a gas turbine engine and nacelle assembly with a thrust reverser according to the present invention, shown in a stowed position.

While the above-identified drawing figures set forth at least one embodiment of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, a pivot thrust reverser can be deployed to circumferentially surround (or, synonymously, contour around) a gas turbine engine inner bypass duct wall such that a fan bypass stream is interrupted and reversed with relatively little leakage, while a core stream and a nacelle ventilation stream are unobstructed or substantially unobstructed. When stowed, thrust reverser pivot doors can make up a portion of both a surface of a bypass duct (e.g., an outer duct wall) and an outer surface of a nacelle. The pivot doors can be pivotally deployed from a stowed position to a deployed position, on pivot axises that are spatially fixed relative to the gas turbine engine, by at least three actuators configured so as to avoid interference from engine and/or nacelle structures.

Figure 1B:
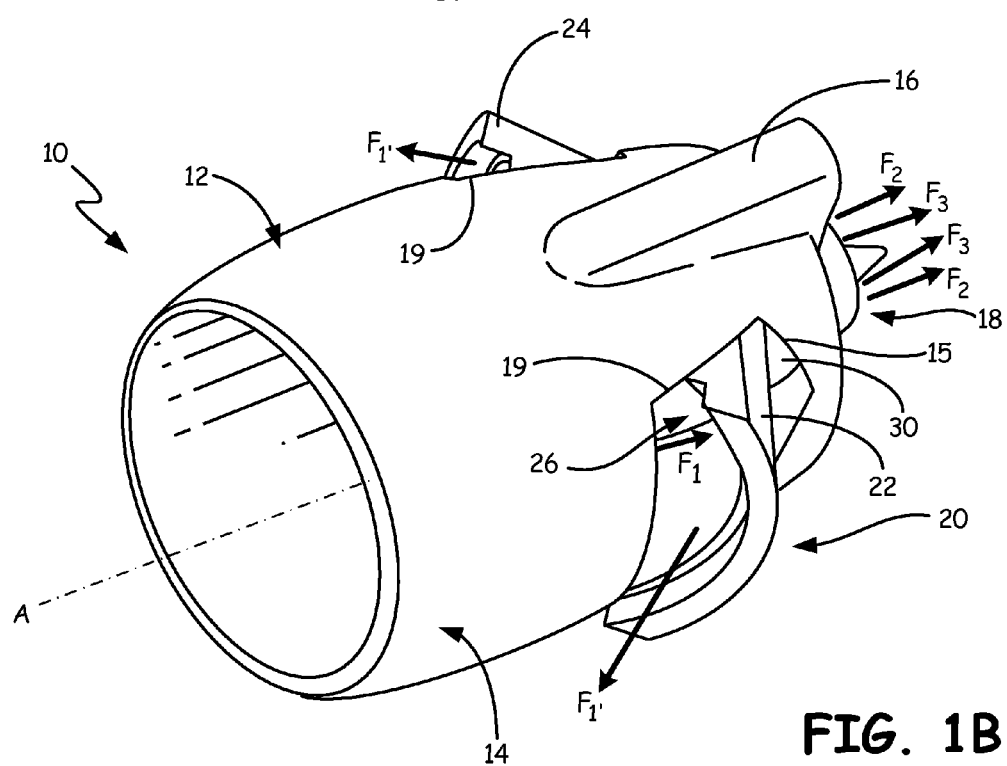
FIG. 1B is a perspective view of the gas turbine engine and nacelle assembly of FIG. 1A with the thrust reverser shown in a deployed position.
Figure 1C:
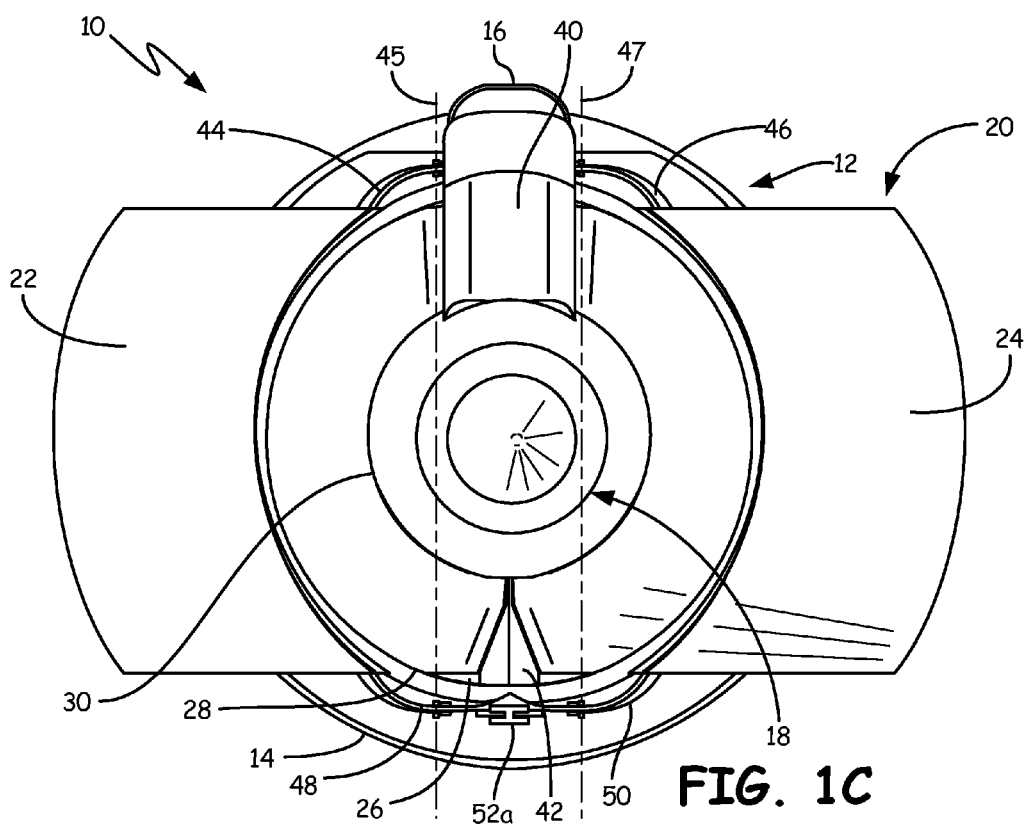
FIG. 1C is an aft elevation view of the gas turbine engine and nacelle assembly of FIG. 1B with interior structures of the engine omitted.

FIGS. 1A, 1B and 1C show an embodiment of gas turbine engine and nacelle assembly 10. FIG. 1A shows a perspective view of assembly 10 with pivot thrust reverser 20 in a stowed position. FIG. 1B shows a perspective view of assembly 10 with pivot thrust reverser 20 in a deployed position. FIG. 1C shows an aft elevation view of assembly 10 with pivot thrust reverser 20 in the deployed position, and certain interior structures of engine 18 (e.g., turbine blades) omitted for simplicity. Assembly 10 includes nacelle 12, outer surface 14 of nacelle 12, pylon 16, engine 18, nacelle openings 19, pivot thrust reverser 20 with first pivot door 22 and second pivot door 24, bypass duct 26, outer surface 28 of bypass duct 26, inner surface 30 of bypass duct 26, upper bifurcation (bi-fi) fairing 40, lower bi-fi fairing 42, linkages 44 and 48 of first pivot door 22, linkages 46 and 50 of second pivot door 24, pivot axis 45 of first pivot door 22, pivot axis 47 of second pivot door 24, actuator 52a, fan bypass stream $F_1$, redirected fan bypass stream $F_1$, nacelle ventilation stream $F_2$, and core stream $F_3$. Certain components of assembly 10, such as a fan, have been omitted for simplicity. In this embodiment, actuators in addition to actuator 52a are used, but are visible in and described for FIGS. 3A and 3B. Nacelle 12 provides an annular housing within which a substantial portion of engine 18 is located. Engine 18 is aligned on axis A of assembly 10 in the illustrated embodiment, and can be connected to pylon 16 at an attachment location. Engine 18 includes a compressor, combustor and turbine, which in combination, among others, produce hot combustion gases that provide operational energy for engine 18. The attachment location in the illustrated embodiments is pylon 16, which provides a means for mounting assembly 10 to an aircraft (not shown). Pivot thrust reverser 20 includes both first pivot door 22 and second pivot door 24. As shown here, second pivot door 24 is spaced approximately 180° from first pivot door 22 relative to axis A of assembly 10. Linkages 44 and 46 are upper linkages, while linkages 48 and 50 and lower linkages.

When stowed, as shown in FIG. 1A, first pivot door 22 and second pivot door 24 each form a portion of outer surface 14, such that outer surface 14 is substantially smooth at all points along an exterior of nacelle 12, including interfaces with first pivot door 22 and second pivot door 24. Because first pivot door 22 and second pivot door 24 provide a smooth outer surface 14 of nacelle 12, pivot thrust reverser 20 tends to reduce a risk of undesired aerodynamic concerns.

Inner surface 30 of bypass duct 26 provides an outer surface of a wall covering engine 18. Bypass duct 26 is defined by the annular space within nacelle 12 between inner surface 30 and outer surface 28 of bypass duct 26. A portion of outer surface 28 of bypass duct 26 is formed by the interior of nacelle 12 with the other portion of outer surface 28 of bypass duct 26, where openings 19 are located, formed by first pivot door 22 and second pivot door 24 when in the stowed position, as shown in FIG. 1A.

Both first pivot door 22 and second pivot door 24 can pivot on respective pivot axises that are each spatially fixed relative to assembly 10. Thus, first pivot door 22 and second pivot door 24 only pivot into the deployed position, without requiring any translation of portions of nacelle 12, first pivot door 22, or second pivot door 24 of assembly 10. Both first pivot door 22 and second pivot door 24 pivot into openings 19 so as to open upstream from an aft end of nacelle 12, such that first pivot door 22 and second pivot door 24 pivot open inside of nacelle 12, obstructing the flow through bypass duct 26.

Fan bypass stream $F_1$ is relatively cold air which enters through the fan at the front end of nacelle 12 and passes through bypass duct 26. When pivot thrust reverser 20 is in the stowed position, fan bypass stream $F_1$ exits from an aft end of nacelle 12 and provides a majority of the propulsion generated by the high bypass gas turbine engine. However, when pivot thrust reverser 20 is in the deployed position, as shown in FIGS. 1B and 1C, first pivot door 22 and second pivot door 24 open inside of nacelle 12 and obstruct at least a portion of the flow of fan bypass stream $F_1$ through bypass duct 26, such that a redirected fan bypass stream $F_1$ no longer exits from the aft end of nacelle 12, but is instead diverted in another direction. Redirected fan bypass stream $F_1$ is redirected by deployed pivot thrust reverser 20 to flow in the forward, or upstream, direction shown here. Importantly, pivot thrust reverser 20 is configured such that there need not be any actuators, linkages, or other obstructions present in $F_1$ flow path when pivot thrust reverser 20 is in the deployed position, which could otherwise obstruct the flow of fan bypass stream $F_1$ in the forward direction, thus reducing the effectiveness of pivot thrust reverser 20. Redirecting fan bypass stream $F_1$ as shown can not only prevent fan bypass stream $F_1$ from providing forward propulsion, but can also actively provide deceleration. Yet, nacelle ventilation stream $F_2$ and core stream $F_3$, which flow through the inside of engine 18, can remain unobstructed and continue to flow out downstream of engine 18 when pivot thrust reverser 20 is deployed in substantially the same manner as when pivot thrust reverser 20 is in the stowed position.

Upper bi-fi fairing 40 and lower bi-fi fairing 42 serve to interconnect nacelle 12 and engine 18, as well as provide additional stiffness for nacelle 12 and space for wires, tubes and other similar components. Linkage 44 provides a hinged connection between first pivot door 22 and pivot axis 45, with linkage 44 fixed to nacelle 12 at pivot axis 45. Pivot axis 45 is spaced from first pivot door 22 and extends from linkage 44 to linkage 48. Linkage 48 provides a connection between first pivot door 22 and actuator 52a. In the same manner, linkage 46 provides a hinged connection between second pivot door 24 and pivot axis 47, with linkage 46 fixed to nacelle 12 at pivot axis 47. Pivot axis 47 is spaced from second pivot door 24 and extends from linkage 46 to linkage 50. Linkage 50 provides a connection between second pivot door 24 and actuator 52a. Pivot axis 45 and pivot axis 47 can be spatially fixed relative to assembly 10, nacelle 12, and/or engine 18.

Actuator 52a, along with actuators 52b and 52c (shown in FIGS. 3A and 3B), pivots both first pivot door 22 and second pivot door 24 from the stowed position to the deployed position without translation of first pivot door 22, second pivot door 24, or any portion of nacelle 12. In the deployed position shown in FIGS. 1B and 1C, first pivot door 22 and second pivot door 24 circumferentially surround inner surface 30 of bypass duct 26. First pivot door 22 and second pivot door 24 are configured to circumferentially surround inner surface 30 of bypass duct 26 such that an at least partially sealing mating relationship is formed and there is relatively little leakage of fan bypass stream $F_1$ (the only leakage coming from portions where bypass duct 26 is visible). This means that nearly all of fan bypass stream $F_1$ is redirected, resulting in a highly efficient pivot thrust reverser 20. Yet, at the same time entire pivot thrust reverser 20 provides a simplified design requiring minimal parts, and thus increases reliability and reduces maintenance costs.

Figure 2:
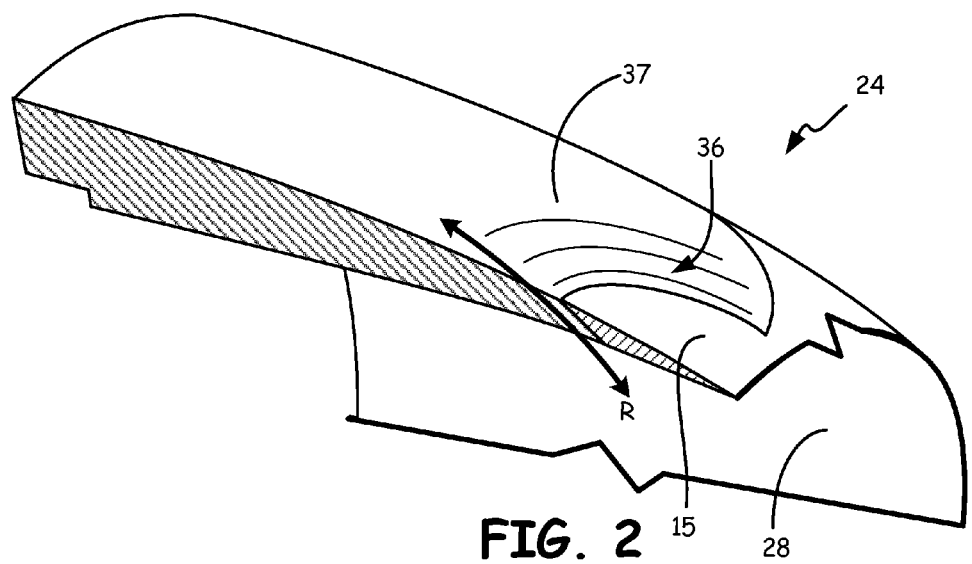
FIG. 2 is a perspective view of a pivot door of the thrust reverser and a portion of a bypass duct surface.

FIG. 2 is a perspective view of second pivot door 24 of pivot thrust reverser 20. In addition to a portion of outer surface 28 of bypass duct 26, also shown are projection 15 of nacelle 12, edge curvature 36, and rotational curvature R. For pivot thrust reverser 20 to be effective, pivot doors 22 and 24 must be able to pivot, open at an appropriate angle into the deployed position (shown in FIGS. 1B and 1C), and circumferentially surround inner surface 30 all without being obstructed by projection 15 of nacelle 12. If pivot doors 22 and 24 are obstructed from opening at the appropriate angle by projection 15 of nacelle 12, fan bypass stream $F_1$ will not be redirected in the forward direction. Additionally, obstruction by projection 15 can prevent pivot doors 22 and 24 from tightly surrounding inner surface 30, and as a result allow leakage of fan bypass stream $F_1$, in turn reducing the effectiveness of thrust reverser 20. To avoid obstruction, for example, pivot axis 47 of second pivot door 24 can be at a location on nacelle 12 that allows second pivot door 24 to pivot along rotational curvature R. Also, second pivot door 24 can have edge curvature 36 to allow second pivot door 24 to tightly surround inner surface 30 of bypass duct 26 and bi-fi fairings 40 and 42. Therefore, rotational curvature R, in combination with edge curvature 36, can allow pivot door 24 to both deploy at the necessary angle and tightly surround inner surface 30 and bi-fi fairings 40 and 42 to effectively capture substantially all of fan bypass stream $F_1$ and redirect it in the forward direction.

Figure 3A:
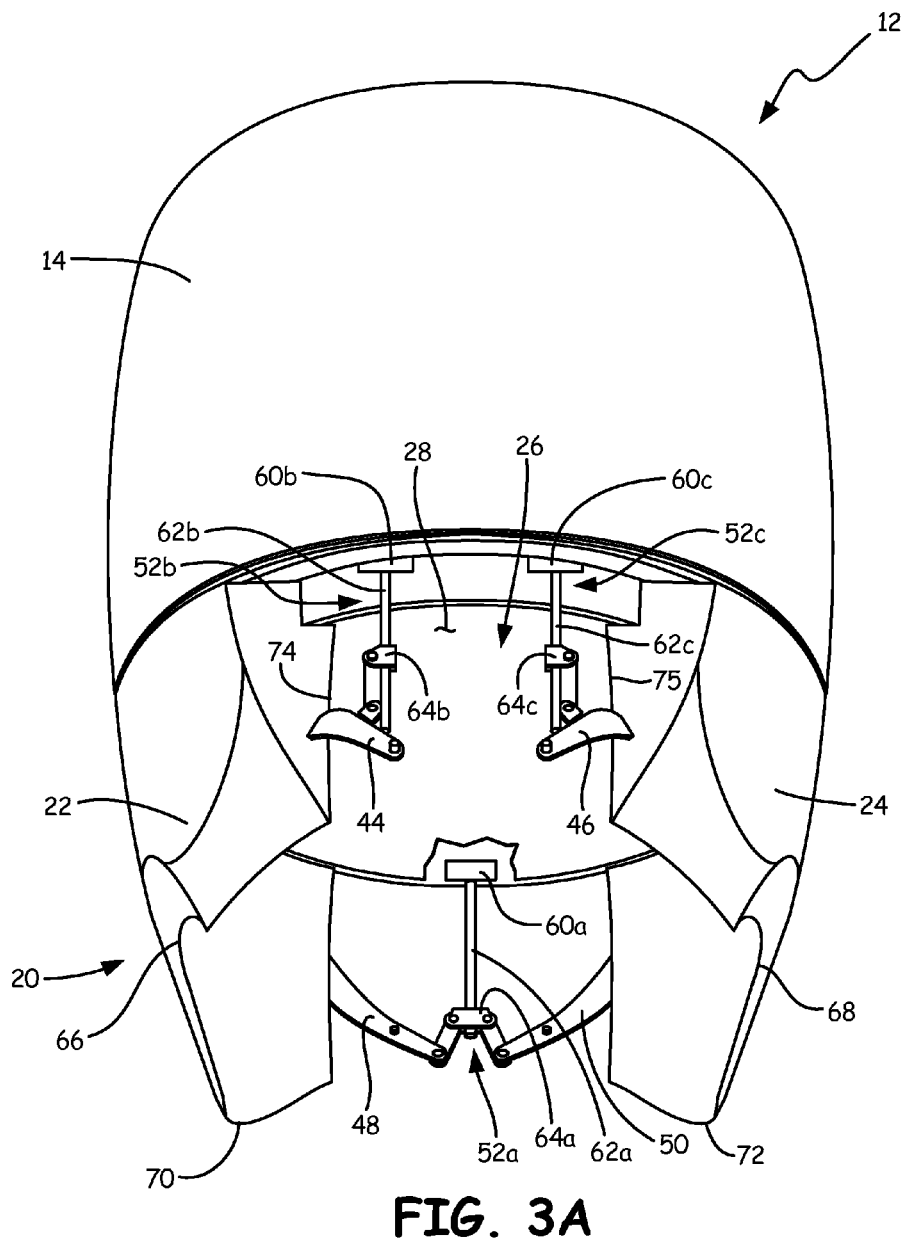
FIG. 3A is an aft perspective view of the nacelle assembly with the thrust reverser in the stowed position and a portion of the nacelle assembly omitted to reveal otherwise concealed structures.
Figure 3B:
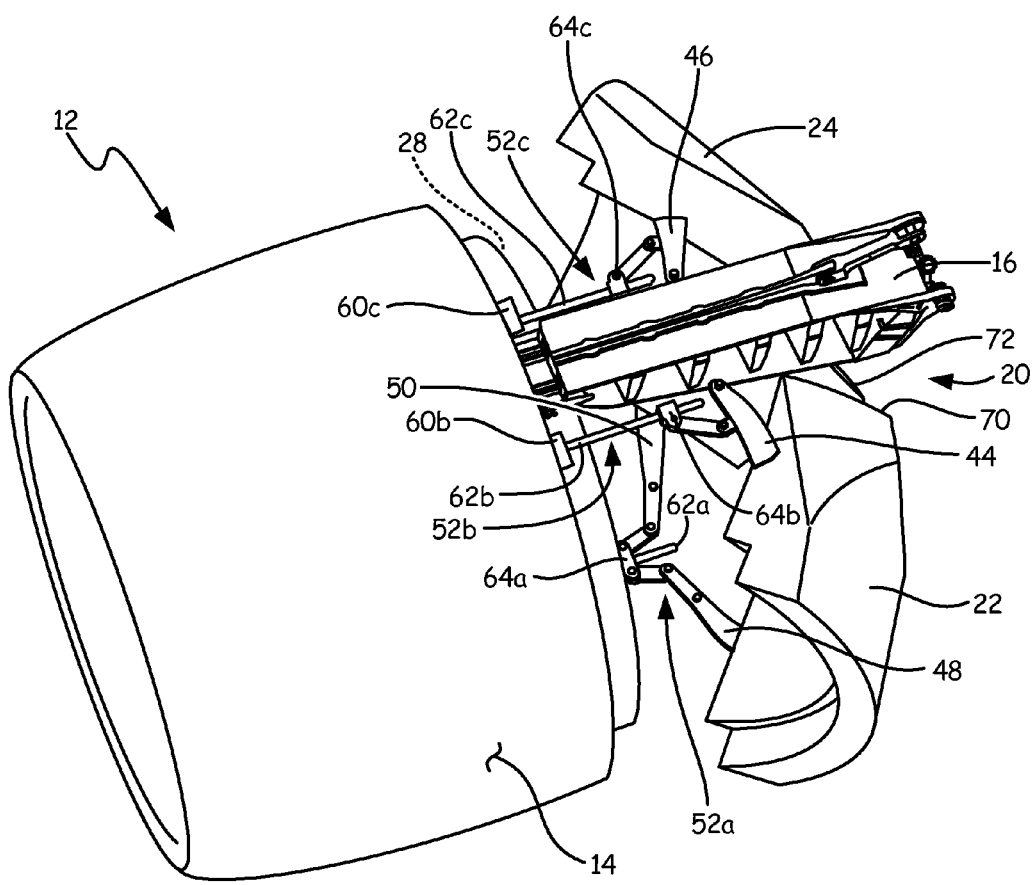
FIG. 3B is a perspective view of the nacelle assembly of FIG. 2A with the thrust reverser in the deployed position and part of a pylon included. Portions of the nacelle assembly and pylon are omitted to reveal otherwise concealed structures.

FIGS. 3A and 3B show perspective views of a portion of nacelle 12, with other nacelle 12 portions omitted to reveal otherwise concealed structures. FIG. 3A shows thrust reverser 20 in a stowed position. FIG. 3B shows thrust reverser 20 in a deployed position, with a portion of pylon 16 included. In addition to that shown and described previously, included are actuators 52b and 52c, motors 60a, 60b, and 60c, threaded rods 62a, 62b, and 62c, threaded knuckleheads 64a, 64b, and 64c, cutouts 66 and 68, aft edges 70 and 72, and edges 74 and 75. Actuators 52a, 52b, and 52c are located between outer surface 28 of bypass duct 26 and outer surface 14 of nacelle 12 (see also FIG. 1C). Outer surface 28 is cut-away in FIG. 3A to show the location of motor 60a of actuator 52a. The configuration of actuators 52a, 52b, and 52c as shown, results in pivot door 22 being pivoted from the stowed position to the deployed position by actuators 52a and 52b, while pivot door 24 is pivoted by actuators 52a and 52c.

There may be applications where fan bypass stream $F_1$ has a high enough velocity to create forces on deployed pivot doors 22 and 24 of a great enough magnitude that actuator 52a alone, without the presence of actuators 52b and/or 52c, would not be able to keep pivot doors 22 and 24 is the proper deployed positions. However, the location of pylon 16 prevents the use of a second actuator opposite (i.e. 180° apart from relative to axis A) actuator 52a. Therefore, actuators 52a, 52b, and 52c are configured to keep pivot doors 22 and 24 secured in the deployed position, while at the same time avoiding pylon 16 interference. Actuators 52b and 52c are both located near pylon 16, on opposite side of pylon 16. Actuator 52b is located circumferentially between pylon 16 and edge 74 of pivot door 22 when pivot door 22 is in the stowed position (shown in FIG. 3A). Actuator 52c is located circumferentially between pylon 16 and edge 75 of pivot door 24 when pivot door 24 is in the stowed position (shown in FIG. 3A). The configuration of the illustrated embodiment also does not require any actuators, linkages, or other obstructions be present in redirected fan bypass stream $F_1$ flow path when pivot thrust reverser 20 is in the deployed position, thus increasing the effectiveness of pivot thrust reverser 20.

Actuators 52a, 52b, and 52c can be, for example, bolt screw linear actuators as shown here that include motors 60a, 60b, and 60c, threaded rods 62a, 62b, and 62c, and threaded knuckleheads 64a, 64b, and 64c. However, various other types of actuators can also be used in alternate embodiments to pivot both first pivot door 22 and second pivot door 24 between the stowed and deployed positions. Motors 60a, 60b, and 60c move threaded knuckleheads 64a, 64b, and 64c down threaded rods 62a, 62b, and 62c towards motor 60a, 60b, and 60c, and in so doing, simultaneously pivot both first pivot door 22 and second pivot door 24 from the stowed position to the deployed position on fixed pivot axises 45 and 47 (shown in FIG. 1C) respectively. Because pivot axises 45 and 47 are fixed relative to nacelle 12, first pivot door 22 and second pivot door 24 are pivoted by actuators 52a, 52b, and 52c between stowed and deployed positions without translating (relative to assembly 10).

Additionally, first pivot door 22 contains cutout 66 in aft edge 70 and second pivot door 24 contains cutout 68 in aft edge 72. Both cutouts 66 and 68 are located on lower portions of aft edges 70 and 72 respectively. When in the deployed position, as shown here, aft edge 70 of first pivot door 22 faces aft edge 72 of second pivot door 24. As a result, cutout 66 is aligned to face cutout 68 when pivot doors 22 and 24 are deployed, forming an opening in pivot thrust reverser 20 to accommodate engine 18. Both cutout 66 and cutout 68 can be arc-shaped, resulting in the opening in pivot thrust reverser 20 being generally circular in shape. However, in alternative embodiments, cutouts 66 and 68 can have various different shapes and be placed at any location on first pivot door 22 and second pivot door 24.

The present embodiments provide a highly effective thrust reverser 20 for use in a gas turbine engine. This is because configuring pivot doors 22 and 24 with cutouts 66 and 68 to circumferentially surround inner surface 30 of bypass duct 26 as shown allows nearly all of fan bypass stream $F_1$ to be redirected in the appropriate direction, while at the same time minimizing the number of components needed to pivot both pivot doors 22 and 24 from the stowed to the deployed position. This is turn decreases the weight of thrust reverser 20 while increasing the reliability of thrust reverser 20. Additionally, the design of thrust reverser 20 avoids interference from obstructions and provides a modular assembly which allows for direct mounting of thrust reverser 20 in position.

Discussion of Possible Embodiments

The following are non-exclusive descriptions of possible embodiments of the present invention.

A pivot thrust reverser for use in a gas turbine engine assembly, the pivot thrust reverser comprising a first pivot door with an upper linkage and a lower linkage; a second pivot door spaced from the first pivot door with an upper linkage and a lower linkage; a first actuator located on a first side of an attachment location to drive the upper linkage of the first pivot door; a second actuator located on a second side of the attachment location to drive the upper linkage of the second pivot door; and a third actuator located substantially radially opposite the attachment location to drive both the lower linkage of the first pivot door and the lower linkage of the second pivot door. The first pivot door is configured to be pivoted from a stowed position to a deployed position by both the first actuator and the third actuator. The second pivot door is configured to be pivoted from the stowed position to the deployed position by both the second actuator and the third actuator.

The pivot thrust reverser of the preceding paragraph can optionally include, additionally and/or alternatively, any one or more of the following features, configurations, and/or additional components:

The first actuator, the second actuator and the third actuator are all located between a surface of a bypass duct and an outer surface of a nacelle.

The first actuator, the second actuator, and the third actuator are circumferentially spaced apart.

The first pivot door and the second pivot door each form both a portion of the surface of the bypass duct and a portion of the outer surface of the nacelle when in the stowed position.

The first pivot door and the second pivot door are pivoted from the stowed position to the deployed position on respective pivot points that are each spatially fixed relative to the gas turbine engine assembly.

In the deployed position the first pivot door and the second pivot door each circumferentially surround an inner surface of a bypass duct such that when the pivot thrust reverser is deployed during engine operation a fan bypass stream is redirected while both a core stream and a nacelle ventilation stream flow in substantially the same manner as when the pivot thrust reverser is stowed.

The second pivot door is spaced approximately 180° from the first pivot door relative to an axis of the gas turbine engine assembly.

A first cutout on the first pivot door.

A second cutout on the second pivot door.

The first cutout on the first pivot door and the second cutout on the second pivot door are both arc-shaped.

The first pivot door and the second pivot door are each located substantially at an aft portion of a nacelle, and wherein the nacelle contains one opening at the aft portion where the first pivot door is located when in a stowed position and opens into when in a deployed position and a second opening at the aft portion where the second pivot door is located when in a stowed position and opens into when in a deployed position.

A method for use in a gas turbine engine assembly, the method comprising pivoting a first pivot door from a stowed position to a deployed position by a first actuator and a third actuator; and pivoting a second pivot door spaced from the first pivot door from the stowed position to the deployed position by a second actuator and the third actuator.

The method of the preceding paragraph can optionally include, additionally and/or alternatively, the following techniques, steps, features and/or configurations:

Circumferentially surrounding an inner surface of a bypass duct with the first pivot door and the second pivot door when the first pivot door and the second pivot door are in the deployed position; and redirecting a fan bypass stream during engine operation when the first pivot door and the second pivot door are in the deployed position.

Maintaining both a core stream and a nacelle ventilation stream to flow in the same manner as when the first pivot door and the second pivot door are in the stowed position.

The first pivot door and the second pivot door are pivoted on respective pivot points each spatially fixed relative to the gas turbine engine assembly.

Locating the first pivot door and the second pivot door to form both a portion of a surface of a bypass duct and a portion of an outer surface of a nacelle when in a stowed position.

Locating the first actuator, the second actuator, and the third actuator between the surface of the bypass duct and the outer surface of the nacelle.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like. Furthermore, terms such as "top," "upper," "bottom," and "lower" are used in a relative sense, and it should be acknowledged that assembly 10 can have many orientations during use, such as when utilized on an aircraft. Such aircraft uses can also include mounting assembly 10 such that thrust reverser 20 can deploy horizontally, vertically, or any angles in between.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pivot thrust reverser for use in a gas turbine engine assembly, the pivot thrust reverser comprising:
   a first pivot door with an upper linkage and a lower linkage;
   a second pivot door spaced from the first pivot door with an upper linkage and a lower linkage;
   a first actuator located on a first side of an attachment location to drive the upper linkage of the first pivot door;
   a second actuator located on a second side of the attachment location to drive the upper linkage of the second pivot door; and
   a third actuator located substantially radially opposite the attachment location to drive both the lower linkage of the first pivot door and the lower linkage of the second pivot door, wherein the first pivot door is configured to be pivoted from a stowed position to a deployed position by both the first actuator and the third actuator, and wherein the second pivot door is configured to be pivoted from the stowed position to the deployed position by both the second actuator and the third actuator.

2. The pivot thrust reverser of claim 1, wherein the first actuator, the second actuator and the third actuator are all located between a surface of a bypass duct and an outer surface of a nacelle.

3. The pivot thrust reverser of claim 2, wherein the first actuator, the second actuator, and the third actuator are circumferentially spaced apart.

4. The pivot thrust reverser of claim 2, wherein the first pivot door and the second pivot door each form both a portion of the surface of the bypass duct and a portion of the outer surface of the nacelle when in the stowed position.

5. The pivot thrust reverser of claim 1, wherein the first pivot door and the second pivot door are pivoted from the stowed position to the deployed position on respective pivot points that are each spatially fixed relative to the gas turbine engine assembly.

6. The pivot thrust reverser of claim 1, wherein in the deployed position the first pivot door and the second pivot door each circumferentially surround an inner surface of a bypass duct such that when the pivot thrust reverser is deployed during engine operation a fan bypass stream is redirected while both a core stream and a nacelle ventilation stream flow in substantially the same manner as when the pivot thrust reverser is stowed.

7. The pivot thrust reverser of claim 1, wherein the second pivot door is spaced approximately 180° from the first pivot door relative to an axis of the gas turbine engine assembly.

8. The pivot thrust reverser of claim 1, further comprising a first cutout on the first pivot door.

9. The pivot thrust reverser of claim 8, further comprising a second cutout on the second pivot door.

10. The pivot thrust reverser of claim 9, wherein the first cutout on the first pivot door and the second cutout on the second pivot door are both arc-shaped.

11. The pivot thrust reverser of claim 1, wherein the first pivot door and the second pivot door are each located substantially at an aft portion of a nacelle, and wherein the nacelle contains one opening at the aft portion where the first pivot door is located when in the stowed position and opens into when in the deployed position and a second opening at the aft portion where the second pivot door is located when in the stowed position and opens into when in the deployed position.

12. A method for use in a gas turbine engine assembly, the method comprising:

pivoting a first pivot door with an upper linkage and a lower linkage from a stowed position to a deployed position by a first actuator and a third actuator with the first actuator driving the upper linkage connected to the first pivot door and the third actuator driving the lower linkage connected to the first pivot door; and pivoting a second pivot door with an upper linkage and a lower linkage spaced from the first pivot door from the stowed position to the deployed position by a second actuator and the third actuator with the second actuator driving the upper linkage connected to the second pivot door and the third actuator driving the lower linkage connected to the second pivot door.

13. The method of claim 12, further comprising:

circumferentially surrounding an inner surface of a bypass duct with the first pivot door and the second pivot door when the first pivot door and the second pivot door are in the deployed position; and redirecting a fan bypass stream during engine operation when the first pivot door and the second pivot door are in the deployed position.

14. The method of claim 13, further comprising maintaining both a core stream and a nacelle ventilation stream to flow in the same manner as when the first pivot door and the second pivot door are in the stowed position.

15. The method of claim 13, wherein the first pivot door and the second pivot door are pivoted on respective pivot points each spatially fixed relative to the gas turbine engine assembly.

16. The method of claim 15, further comprising locating the first pivot door and the second pivot door to form both a portion of a surface of a bypass duct and a portion of an outer surface of a nacelle when in a stowed position.

17. The method of claim 16, further comprising locating the first actuator, the second actuator, and the third actuator between the surface of the bypass duct and the outer surface of the nacelle.

* * * * *